Dec. 5, 1967    G. H. MAY ET AL    3,356,021
SELECTIVE PRINTER AND SYSTEM FOR PROCESSING
TICKETS HAVING MAGNETIC INFORMATION THEREON
Filed Jan. 14, 1966    3 Sheets-Sheet 1
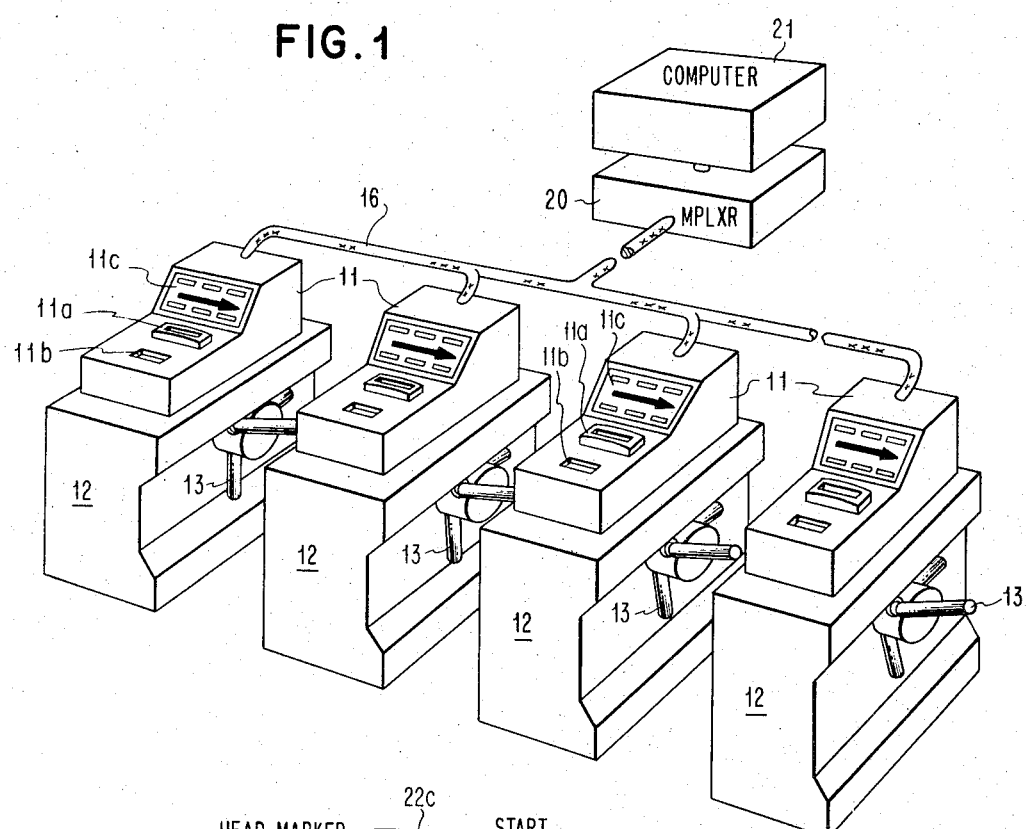
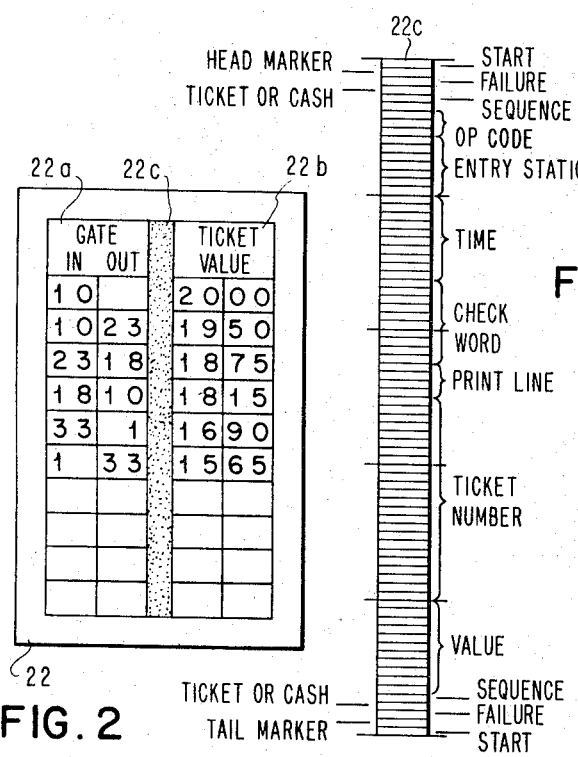
INVENTORS
GORDON H. MAY
THOMAS A. HICKOX
By *Walter S. Madden, Jr.*
ATTORNEY 3,356,021
SELECTIVE PRINTER AND SYSTEM FOR PROCESSING TICKETS HAVING MAGNETIC INFORMATION THEREON
Gordon H. May and Thomas A. Hickox, San Jose, Calif., assignors to International Business Machines Corporation, Armonk, N.Y., a corporation of New York
Filed Jan. 14, 1966, Ser. No. 520,769
8 Claims. (Cl. 101—93)

ABSTRACT OF THE DISCLOSURE

A ticket handling mechanism for processing commutation tickets which includes a ticket orientation sensing means for directing a ticket to one of alternate paths past a magnetic transducer for reading and updating machine-readable fare information and a print station for printing fare information on the ticket in a consistent manner regardless of the orientation of the ticket.

Background

There has been considerable interest in recent years in rapid transit systems for the large metropolitan areas of the world as a means of solving or at least reducing the increasing congestion resulting from the automobile. One of the most important requirements for any effective rapid transit system is a means of fare collection which is reliable and relatively simple for a passenger to operate, and which is also fully or substantially automatic so as to reduce the number of personnel required at the various stations in the system.

In accordance with the present invention, there is provided a handling mechanism for use with tickets in a rapid transit system or the like which is capable of performing a number of functions in connection with the ticket. The ticket handling mechanism of this invention preferably is connected to a computer which is associated with one or more of the ticket handling devices to perform a number of calculations and other operations relative to information on the ticket.

The ticket itself preferably is printed on paper and has a plurality of spaces thereon for printing of a variety of information, including the location at which the ticket was purchased, the purchase price, the stations at which the ticket is used for entry and exit from the transit system, and the remaining value of the ticket at any time. The ticket also contains a machine-readable portion, such as a magnetic stripe down the middle thereof, on which are encoded different types of information. After the ticket has been inserted in the ticket handling mechanism of this invention, this magnetic stripe is read by apparatus in the ticket handling device, and the information therefrom supplied to the computer for the appropriate calculations. After these calculations, the computer supplies information to the ticket handling mechanism, which causes updated information to be printed on the ticket prior to its return to the passenger.

One of the important features of the ticket handling mechanism of the present invention is its ability to accept tickets which are inserted in any orientation, i.e., upside down, right side up, and with the magnetic stripe facing either direction. This ability to accept tickets in any orientation is accomplished in the present invention by providing alternate paths for the ticket flow within the handling mechanism. In one embodiment, the particular path is selected by sensing the direction which the magnetic stripe is facing and routing the ticket through the ticket handling mechanism in dependence upon this sensed direction so that the magnetic stripe is properly oriented to be read and recorded by the magnetic transducers in the ticket handling mechanism. The accommodation of right side up or upside down tickets is facilitated in one embodiment of the present invention by the use of special magnetic encoding at the beginning and at the end of the magnetic stripe of the ticket. These special marks are sensed by the magnetic reading apparatus as the ticket moves through the ticket handling mechanism and an indication is thus provided as to which end of the ticket is proceeding first through the handling mechanism.

After the ticket has been sensed magnetically, it arrives at a print station where printing, preferably under the control of the associated computer, is placed on the ticket. In this connection, the printing apparatus contains pairs of each numeral or character to be printed, the elements of a pair being reversed relative to each other so that one or the other is properly oriented for printing on the ticket regardless of which direction the ticket is facing in the print station. This printing, as stated above, will indicate entry and exit stations, remaining value, etc. After this printing, the ticket handling mechanism returns the ticket to the passenger if there is value remaining on the ticket, or alternatively, if the ticket value has been completely used, it is routed to a stacker associated with the handling mechanism.

The ticket handling mechanism of the present invention is capable of performing a variety of functions in connection with fare collection, including the above described fare deduction from a ticket. Additional functions which may be performed include the vending of new tickets, the issuing of a new ticket in response to receipt of a deficit or a zero value ticket from the customer, and the receipt of credit cards for processing and crediting of a passenger's account. Although the basic mechanism of this invention is capable of performing all of the above functions, from a practical standpoint it may be desirable to have different machines perform different functions. Thus, one or more machines may be used for regular fare collection and control entry and exit gates, while other machines located in other areas of the station may be used for deficit fare collection and to vend new tickets in response to passengers depositing the required amount of money. By placing the money-operated machine away from the entry and exit gates, congestion and delay of passengers with valid tickets may be avoided. In connection with the dispensing of new tickets or deficit fare collections, it will be understood that there will be associated with the ticket handling mechanism suitable coin or currency slots or the like to receive the appropriate amount of money from a passenger to pay for the ticket desired.

It is therefore an object of the present invention to provide an improved fare collection system for rapid systems and the like.

It is a further object of this invention to provide ticket handling apparatus for processing tickets used in a rapid transit system, in which the apparatus accepts tickets from a passenger and reproduces a coded signal thereon for use in calculating the remaining value of the ticket, and in which this remaining value is printed on the ticket prior to its return to the passenger.

It is a further object of this invention to provide apparatus for a fare collection system for processing tickets having magnetic information recorded thereon and having spaces in which printing is to be placed each time the ticket is processed, the apparatus being capable of accepting tickets presented thereto in any orientation to reproduce the magnetic information and place printing in the appropriate spaces.

It is a further object of the present invention to provide ticket handling apparatus for a rapid transit system, in which the handling apparatus accepts a ticket having machine readable information thereon and processes the ticket to calculate the fare required for the trip just completed and to subtract this fare from the value of the ticket and print the remaining value of the ticket on the face thereof prior to its return to the passenger.

Objects and advantages other than those set forth above will be apparent from the following description when read in connection with the accompanying drawings, in which:

FIGURE 1 is a perspective view illustrating a plurality of the ticket handling mechanisms of the present invention connected to an associated computer;

FIGURE 2 illustrates a ticket designed for use in the ticket handling apparatus of this invention;

FIGURE 3 shows the magnetic encoding which may be used on the ticket of FIGURE 2;

Figure 4:
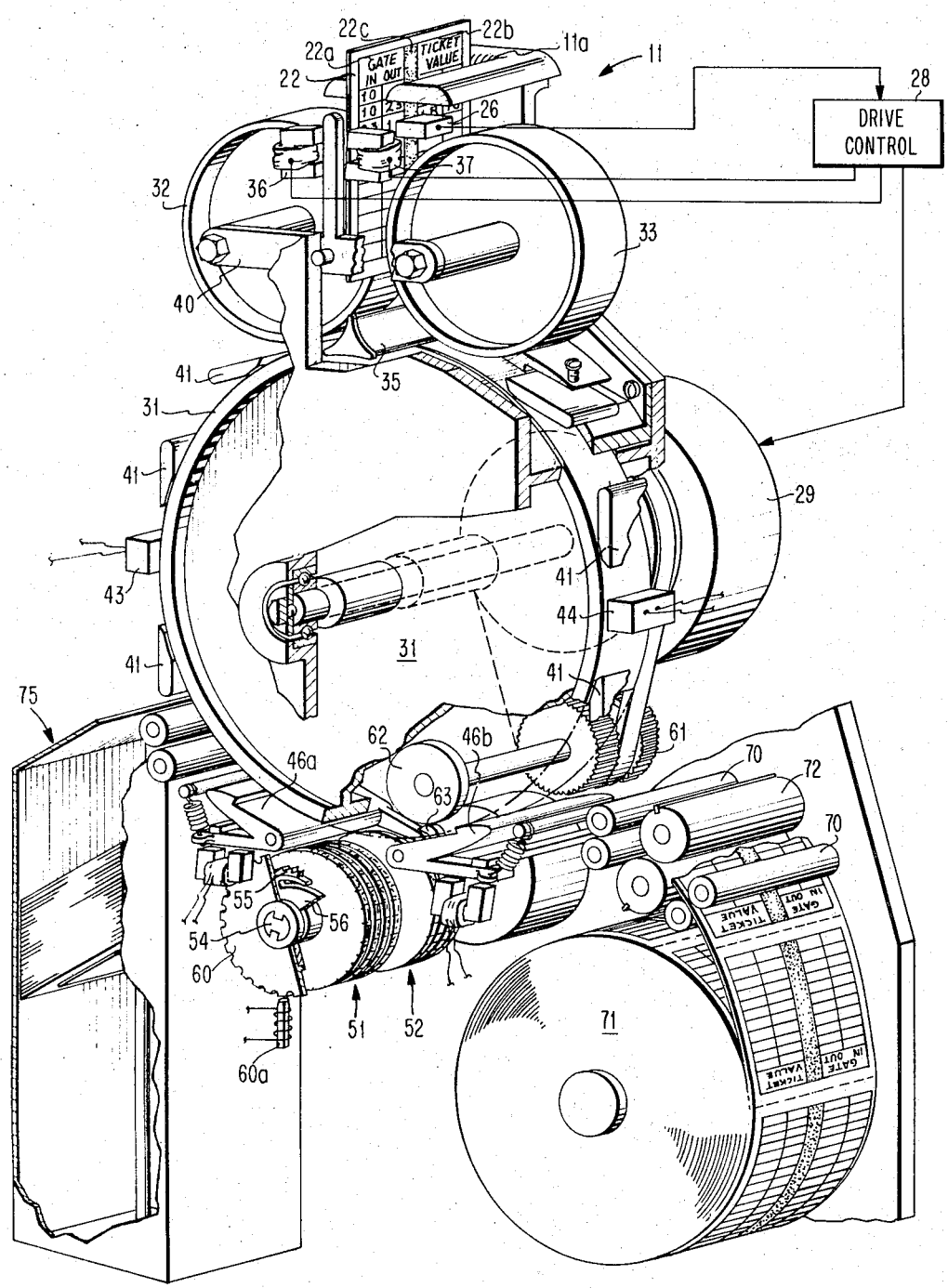
FIGURE 4 is a perspective view, partly in section, illustrating the details of the ticket handling apparatus.

Referring to the drawing by character of reference, FIGURE 1 shows a fare collection system employing a plurality of ticket handling devices of the present invention working in conjunction with an associated computer. In FIGURE 1, each of the ticket handling devices 11 is associated with an entry or exit gate 12 for controlling the flow of passengers through these gates in response to tickets presented to the ticket handling devices by the passengers. The ticket handling devices 11 may control suitable means, such as turnstiles 13, which are unlocked in response to signals from the associated ticket handling device to permit the passenger to pass therethrough. It will be understood that other ticket handling devices may be located elsewhere in the station for deficit fare collection, etc., as will be discussed below.

Each of the ticket handling devices 11 is connected through cabling means 16 to an associated computer 21 for processing the various signals supplied from the ticket handling devices and for supplying signals thereto to control operations within the devices 11, in a manner to be described more in detail below. The system may employ a multiplexing device 20 for controlling the connection of a plurality of the ticket handling devices to the single computer, in a manner well known in the communications and data transmission art.

Each of the ticket handling devices 11 is provided with an opening 11a for receipt of a ticket presented by a passenger. Devices 11 are also provided with money-receiving slots 11b and an instruction display panel or area 11c. Ticket opening 11a is adapted to receive a ticket, preferably of the type shown in FIGURE 2. This ticket 22 may be made of paper or other suitable material and contains two vertical columns 22a, 22b separated by a stripe of magnetic material 22c. Columns 22a, 22b receive printing from the printing device of ticket handling mechanisms 11 indicating the place and price of the ticket purchase, the entry and exit points for subsequent uses of the ticket and the remaining value of the ticket at any time. Magnetic stripe 22c is encoded with magnetic information at the time of its issuance, and portions of this magnetic information are updated and revised for each use of the ticket.

FIGURE 3 illustrates one type of magnetic encoding which may be used on stripe 22c when the ticket is to be used in conjunction with computer 21. One of the important features of the invention is the ability of the ticket handling mechanism to accept inserted tickets in any orientation, i.e., upside down, right side up, and with magnetic stripe 22c facing either direction. Magnetic stripe 22c may be provided with appropriate magnetic coding marks indicating which is the start and which is the end of the magnetic code sequence. As indicated in FIGURE 3, stripe 22c may be provided with "start" marks at either end of the magnetic stripe, followed by a "head" mark at the top thereof indicating the head or start of the magnetic code, and a "tail" mark at the other end indicating the end of the magnetic code sequence. These head and tail markers, when sensed by the ticket handling mechanism in a manner to be described below, provide an indication of the right side up or upside down orientation of the ticket, and this information is utilized in the computer in properly reproducing the subsequent magnetic information.

Among the other information which may be magnetically encoded on the magnetic stripe 22c is a section labeled "entry station" identifying the station at which the passenger entered the system, a "time" section indicating the time the passenger entered that entry station, a "check word" section, a "print line" section identifying the line in columns 22a, 22b on which the next printing is to be done, a ticket number section providing a number uniquely identifying a ticket, and a "value section" identifying the remaining value of the ticket. Further details of the significance and use of these different sections of the magnetically encoded information on the ticket will be given in the following description of the operation of the mechanism.

Referring to FIGURE 4, ticket 22 is inserted by the passenger in the ticket opening 11a of device 11 and passes an orientation sensor 26 which senses which direction magnetic stripe 22c is facing. The output signal from orientation sensor 26 is utilized to control the path of the ticket through the handling mechanism. This control may be effected by supplying the output signal from sensor 26 to a network 28 which controls the direction of rotation of a reversible motor 29 to drive a main drive roll 31 in either of two directions. The output from network 28 also controls a pair of receiver rolls 32, 33 which may be selectively pivoted into engagement with the surface of main drive roll 31 through control magnets 36, 37 and linkage 40. Thus, depending upon which direction stripe 22c is facing, as detected by sensor 26, one or the other of rolls 32, 33 is pivoted down into engagement with the main drive roll 31, while a channel or guide member 35 is also moved in one direction or the other to guide the ticket in the appropriate direction. For example, if ticket 22c is facing the direction shown in FIGURE 4, with magnetic stripe 22c facing to the right, then receiver roll 33 is pivoted by its control magnet 37 and linkage 40 into engagement with main drive roll 31, and channel guide 35 pivots to guide ticket 22 to the right side of main drive roll 31, which is rotated in a clockwise direction by motor 29.

As an alternate to utilizing sensor 26 to detect the orientation of stripe 22c and using the "head" and "tail" marks to detect the vertical orientation of the ticket, ticket 22 may be provided with markings, such as holes or colored markings, which may be optically sensed when the ticket enters opening 11a to indicate both the vertical orientation of the ticket and the direction stripe 22c is facing.

A plurality of stationary guide shoes 41 are spaced as shown around the periphery of main drive roll 31 to maintain ticket 22 in engagement with the surface of roll 31. In this connection, roll 31 may be coated with a material providing good frictional engagement with ticket 22 to facilitate feeding of the ticket through the handling mechanism.

The ticket handling mechanism is provided with a pair of magnetic transducers 43, 44 spaced on opposite sides of the diameter of main drive roll 31. Transducers 43, 44 are each provided with a reading or reproducing portion which senses the magnetic information encoded in stripe 22c and provides output signals which are sent to computer 21 through cabling 16. Transducers 43, 44 are also provided with writing portions for updating selected portions of the magnetic information encoded on stripe 22c under control of computer 21.

After passing transducer 43 or 44, ticket 22 is carried to a printing station located diametrically opposite the input station. At the printing station, ticket 22 has the information in columns 22a, 22b updated to reflect the current status of the ticket. The printing station may be of any suitable type and may include a pair of driving registration fingers 46a, 46b, one or the other of which drives the ticket into the printing station, and both of which serve to accurately position the ticket in the printing station at the start of a printing operation. Thus, if ticket 22 arrives at the printing station from the right side of drive roll 31, finger 46b presses the ticket against drive roll 31 to drive the ticket up against the shoulder portion of finger 46a. When one end of the ticket passes finger 46b, ending the positive drive, the other end is positioned against finger 46a which acts as a stop to accurately position the ticket as soon as the positive drive stops.

Figure 5:
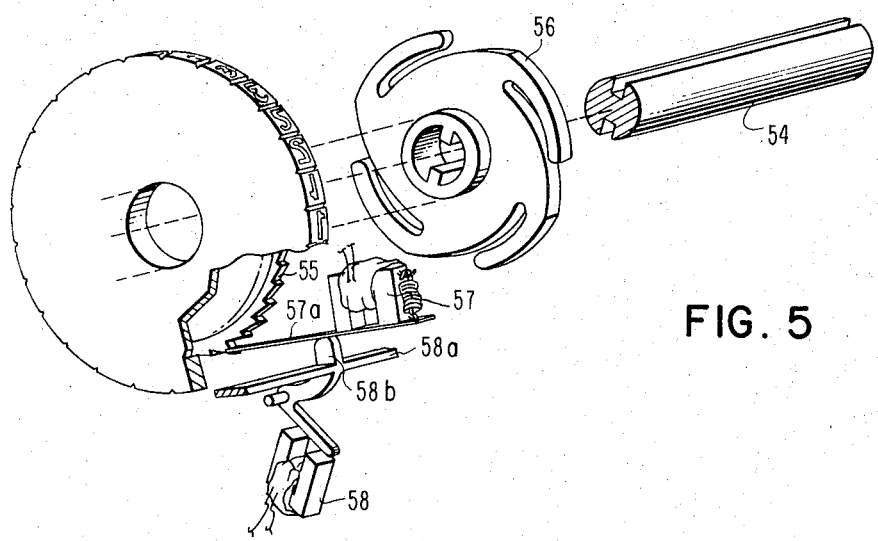
FIGURES 5 and 6 further illustrate the printing mechanism of the ticket handling apparatus.
Figure 6:
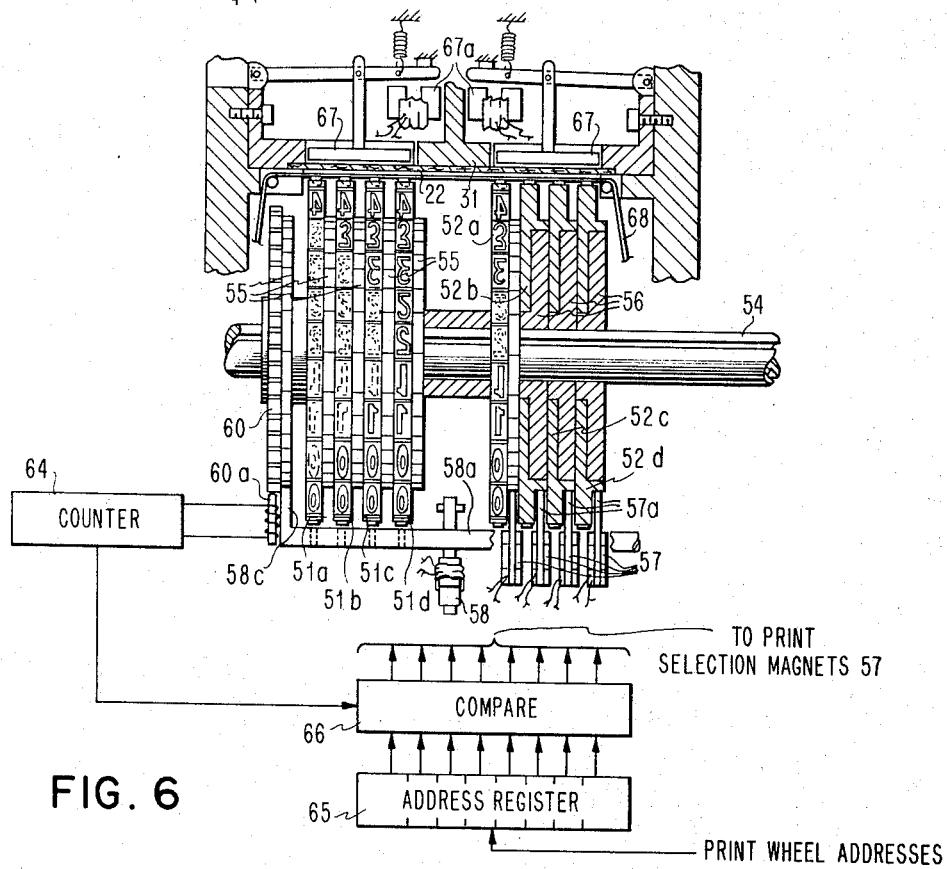

Any suitable printing apparatus may be employed to provide the required printing in columns 22a, 22b of ticket 22. Such means may include a first group of printing wheels 51 and a second group of printing wheels 52. Details of a printing mechanism suitable for use in the ticket handling device of the present invention are illustrated in FIGURES 5 and 6 and will be described more in detail below. For the present, it can be assumed that the print wheels in groups 51, 52 are capable of being indexed to position any desired numeral at the printing position. To control the line on ticket 22 on which information is printed, ticket 22 is stepped incrementally relative to the print station by means including a reversible incrementing clutch drive 61 which drives a wheel 62 to engage the ticket against an idler wheel 63 and move it in increments of one printing line until the appropriate line on the ticket is positioned at the print station. It will be understood that this incrementing drive is controlled through reading of the "print line" portion of the magnetic stripe information on the ticket, as shown in FIGURE 3.

The ticket handling mechanism may be provided with means for storing tickets whose value has been completely used, and such means may include a stacker 75 into which used tickets, as detected by the system, may be stored.

Where the ticket handling mechanism is used as a deficit fare collector or to vend new tickets, it may also have facilities for issuing new tickets in response to insertion of the appropriate amount of money in multiple money slots. Such tickets may be stored in the form of a ticket roll 71, the end of which is fed out through rollers 70 including a cutting roller 72 to place a new ticket in the print station, as will be described in more detail below.

FIGURES 5 and 6 illustrate the details of one type of printing mechanism suitable for use in the present invention. As shown, each of print wheel groups 51, 52 includes the number of individual print wheels required to print the appropriate information in columns 22a, 22b. Where only numeric information is to be printed and where station numbers have no more than two digits, it will be seen from FIGURE 2 that each of columns 22a, 22b will require no more than four numerals for printing. Thus, each of print wheel groups 51, 52 may comprise four individually movable print wheels, such as print wheels 51a, 51b, 51c, 51d for print assembly 51 and print wheels 52a, 52b, 52c and 52d for print assembly 52. Each of the print wheels is provided with raised portions carrying the numbers to be printed, and in accordance with the present invention, each numeral is presented on each print wheel in both the normal and reversed position, so that printing may be produced on ticket 22 regardless of the direction it is facing in the print station.

All of the print wheels are mounted on a common shaft 54, and each print wheel is driven by an associated spacer and friction drive member 56 (FIGURE 5) which is keyed to shaft 54 and rotates therewith. Each print wheel is provided with an associated ratchet, the teeth of which are engaged by the armature of an associated selection magnet 57, one of which is shown in detail in FIGURE 5. When magnetic 57 is energized, armature 57a is pulled toward the magnet to engage one of the teeth of the ratchet, thereby stopping the motion of the print wheel. When the magnet is deenergized, armature 57a is drawn away from engagement with the ratchet teeth by the spring, permitting the ratchet and associated print wheel to be rotated by frictional engagement with the friction drive members 56 until the "home" tooth of the ratchet is engaged by armature 57a, as shown in FIGURE 5, thus stopping rotation.

A print start magnet 58 is provided to control the start of the printing operation. Magnet 58 is provided with an armature 58a having bail portions 58b which engage the armatures 57a of the selection magnets. Start magnet 58 also is provided with a tail 58c (FIGURE 6) for controlling an emitter disk 60 which, in combination with a pick-up sensor 60a, provides an indication of the rotative position of the print wheel assembly. As is well known in the art, emitter disk 60 may be provided with a plurality of teeth around the periphery thereof and sensor 60a is positioned so that passage of each tooth past the sensor produces an output pulse which may be counted from a home position by a counter 64 to provide a measure of the rotative position of disk 60 and the associated print wheel assembly. Emitter 60 also has an associated ratchet 55 which is driven by a spacer and friction drive member 56. The ratchet associated with emitter 60 may have an enlarged "home" tooth, in a manner similar to those for the ratchets of the print wheels.

The print wheel positions at which printing is to occur are transmitted from computer 21 to the printing mechanism and may be stored in suitable means such as an address register 65. Assuming there are 8 print wheels, register 65 may store the 8 addresses or rotative positions at which the different wheels are to print. These stored addresses are compared in a device 66 with the signal from sensor 60a and counter 64, which indicates the rotative position of emitter 60 and the print wheels, and when a print address matches the address from sensor 60a, the print line for that print wheel is energized to pick the associated selection magnet. This attracts the associated armature 57a to engage ratchet 55 and stop the rotation of that print wheel.

When all wheels are in the proper position for printing, printing may commence by suitable means such as a pair of impact plates 67 actuated by print magnets 67a to force ticket 22 against a ribbon 68 which is disposed over the print characters on the print wheels at the print station. During the printing portion of the cycle, emitter disk 60 will continue rotating until tail 58c engages the home tooth on the ratchet 55, at which point emitter 60 stops. After printing, the print selection magnets are deenergized so that armatures 57a are withdrawn from ratchets 55, permitting the print wheels to continue rotation until the "home" tooth of each print wheel ratchet 55 engages its associated armature 57a, thus stopping rotation. All the print wheels thus return to the home position and are ready for another print cycle.

The operation of the invention will best be understood by considering representative applications and uses of the ticket handling mechanism. If a passenger has a valid ticket and wishes to utilize it for passage between one station and a further station on the line, he inserts the ticket in ticket opening 11a in one of the machines 11 located at an entry gate, as shown in FIGURE 1. Upon insertion, the orientation of the ticket is sensed by orientation sensor 26, as discussed above, to control the direction of movement of the ticket through the handling mechanism. As the ticket passes the reading head in transducer 43 or 44, the magnetically encoded information of stripe 22c is read therefrom, including the "head" mark and "tail" mark encodings. The remaining value of the ticket is also checked by computer 21 to insure that there is sufficient remaining value to pay for the minimum fare ride. If there is insufficient value, the ticket is returned to the passenger and he is instructed to purchase an additional ticket. If there is sufficient remaining value, the ticket then passes to the print station where it is positioned, and based on the prine line indicated from the magnetic sensing of stripe 22c, the ticket is indexed by reversible drive 61 and roller 62 to the proper line position. In this connection, it will be understood that some type of buffering may be employed for the signals between the ticket handling devices and computer 21, particularly where a number of ticket handling devices are associated with one computer.

To print, the print wheels of print wheel groups 51, 52 are indexed to the proper position, as described above, to print the number of the entry station in the leftmost position of column 22a. The ticket then leaves the print station and is transported past one of transducers 43, 44 where it is magnetically updated, including a magnetic encoding of the entry station (FIGURE 3), and the time of the passenger's entry into the system. After this magnetic updating, the ticket is returned to the passenger through opening 11a. The return of the ticket also unlocks turnstile 13 to permit the passenger to pass therethrough to the transit vehicle.

The passenger then proceeds on the transit system and upon reaching his desired departure station, inserts ticket 22 in opening 11a of a ticket handling mechanism at an exit gate of that station. Upon insertion in the device 11, the ticket orientation is sensed as before and it then passes one of transducers 43, 44 where the magnetic information on stripe 22c is read, including the entry station, the time of entry at the entry station, the print line, the present value of the ticket, the ticket number and the check word. The ticket then proceds to the print station where it is positioned between fingers 46a, 46b. During the time the ticket is in transit between the transducer 43 or 44 and the print station, computer 21 has calculated the fare for the trip from the entry station indicated in the first line to the exit station at which the passenger is departing and has checked to determine that the remaining value of the ticket is sufficient to pay for this trip. Computer 21 has also checked the elapsed time of the trip to prevent fraud on the system, as well as checking the check word of the magnetic stripe.

Computer 21 then sends signals to the ticket handling mechanism, including signals to the printing device to print the number of the exit station under the "out" column of the appropriate line of column 22a and to print the remaining value of the ticket on the corresponding line in column 22b. Computer 21 also supplies signals to transducer 43 or 44 to update the value of the ticket. After this magnetic updating, the ticket may be routed past the read station of transducer 43 or 44 for a read check to verify the newly recorded information prior to return of the updated ticket to the passenger at opening 11a. When the ticket is returned, the turnstile of the exit gate is unlocked to permit the passenger to depart.

An additional type of operation which may be performed with the ticket handling apparatus of this invention is a deficit fare collection operation in which a ticket has insufficient remaining value to pay for the trip just completed by the passenger. As indicated above, the deficit fare collection machines and ticket vending machines are preferably located away from the machines at the entry and exit gates to avoid delays and congestion at these gates. In this situation, the ticket is inserted as before through opening 11a and processed through the system of the ticket handling apparatus to the print station. After computer 21 calculates that the remaining value of the ticket is insufficient to pay for the trip just completed, the balance owing for that trip is calculated by computer 21 and an indication of this amount presented to the passenger in the display in window 11c, including instructions to the passenger to insert that amount of money in the money slots. The used ticket may be moved into the stacker 75 and a new ticket fed through rolls 70, 72 from roll stock 71. At this point, the unit is awaiting insertion of the proper amount of money in the money slots.

Upon insertion of this amount of money, the unit then prints the station number on the new ticket, and the calculated new value of the ticket on the top line of column 22b. After printing, the new ticket then moves past the write station of transducer 43 or 44 for magnetic updating of the information thereon, as described before, and the ticket then proceeds out of opening 11a to the passenger. The passenger may then present this ticket to a machine 11 at an exit gate and proceed therethrough, as described above.

An additional type of ticket processing which the ticket handling mechanism of the present invention can accomplish occurs where a passenger wishes to upgrade a ticket which has sufficient remaining value but lacks further printing space in columns 22a, 22b. This situation might frequently occur where a passenger has used the ticket for a number of relatively short trips which would utilize all of the printing space in columns 22a, 22b but would not necessarily use the complete value of the ticket. The processing of the ticket in this situation would be similar to that described above for the zero value ticket or deficit fare collection, except that no insertion of currency by the passenger is required. The old ticket, on which all printing space is utilized, would be fed to stacker 75, and a new upgraded ticket indicating the remaining value of the ticket, the station of issuance, etc., including the magnetic encoding thereon of the appropriate information, would be provided to the passenger.

Another function which may be performed is the vending of new tickets from a machine 11 located away from the entry and exit gates. In this situation, the passenger inserts the proper amount of money for the purchase price of the ticket in money opening 11b. In response to this, the end of the roll of ticket material 71 is fed through rollers 70 and cutting roller 72 to position a new ticket at the print station between fingers 46a, 46b. At the print station, the number of the location at which the ticket is purchased is printed in the left most portion of column 22a, while the purchase price of the ticket is printed on the first line of column 22b. After printing, the ticket is moved past one of transducers 43, 44 which magnetically records the appropriate information in column 22c. After this magnetic recording, the ticket is moved out of the opening 11a for issuance to the passenger.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for handling tickets having a magnetic stripe on one side thereof comprising:
   a housing having an opening into which said ticket may be inserted with said stripe extending longitudinally;
   sensing means for determining the direction said stripe is facing;
   drive means for carrying said ticket in a circular path in either direction;
   control means responsive to said sensing means for initiating rotation of said drive means in a direction to carry said ticket with said stripe facing outwardly of said drive means, and
   processing means for processing said ticket while carried by said drive means.

2. Apparatus in accordance with claim 1 in which said processing means includes magnetic transducing means for cooperating with said magnetic stripe.

3. Apparatus for handling tickets having a magnetic stripe on one side thereof and having at least one column on which printing may be placed comprising:
a housing having an opening into which said ticket may be inserted with said stripe extending longitudinally;
sensing means for determining the direction said stripe is facing;
drive roll means rotatable in either direction for carrying said ticket;
control means responsive to said sensing means for initiating rotation of said drive roll means in a direction to carry said ticket with said stripe facing outwardly of said roll means;
magnetic transducing means mounted adjacent said drive roll means for cooperating with said magnetic stripe, and
printing means disposed adjacent said drive roll means and spaced from the magnetic transducer means for printing in said column.

4. Apparatus in accordance with claim 3 in which said transducing means includes two identical magnetic recording and reproducing units disposed diametrically opposite each other adjacent said drive roll means.

5. Apparatus in accordance with claim 3 in which said printing means is disposed diametrically opposite said opening.

6. Apparatus in accordance with claim 3 in which said printing means includes a plurality of indexable print wheels which are rotatable to position different characters at a print position.

7. Apparatus in accordance with claim 6 in which each of said print wheels contains a pair of each character to be printed, the characters of each pair being reversed relative to each other so that one character of each pair will be properly oriented for printing regardless of the longitudinal orientation of said ticket.

8. Apparatus in accordance with claim 6 including positioning means for stopping said ticket adjacent said printing means, and
incrementing means for moving said ticket to position different lines of said column at a print station.

References Cited

UNITED STATES PATENTS

| | | | |
|---|---|---|---|
| 3,146,342 | 8/1964 | Perotto | 235—61.114 |
| 3,194,946 | 7/1965 | Rabinow | 235—61.6 |
| 3,253,125 | 5/1966 | Jorgensen | 235—61.9 |
| 3,294,956 | 12/1966 | Jenkins et al. | 235—61.9 |
| 3,308,273 | 3/1967 | Turner | 235—61.9 |

WILLIAM B. PENN, *Primary Examiner.*